(12) United States Patent
Futakata et al.

(10) Patent No.: US 7,519,102 B1
(45) Date of Patent: Apr. 14, 2009

(54) METHOD OF ASSIGNMENT AND TRANSMISSION OF SPREAD SIGNALS IN DIRECT SEQUENCE SPREAD SPECTRUM CDMA MOBILE COMMUNICATION SYSTEM, MOBILE COMMUNICATION SYSTEM, AND TRANSMITTER, RECEIVER AND TRANSMITTER/RECEIVER OF MOBILE COMMUNICATION SYSTEM

(75) Inventors: Toshiyuki Futakata, Yokosuka (JP);
Masatoshi Kimoto, Yokosuka (JP);
Tsutomu Taguchi, Yokohama (JP);
Yoshiaki Hiramatsu, Yokosuka (JP)

(73) Assignee: NTT Mobile Communications Network, Inc., Tokyo (JP)

( * ) Notice: Subject to any disclaimer, the term of this patent is extended or adjusted under 35 U.S.C. 154(b) by 0 days.

(21) Appl. No.: 09/446,888

(22) PCT Filed: May 7, 1999

(86) PCT No.: PCT/JP99/02370

§ 371 (c)(1),
(2), (4) Date: Dec. 30, 1999

(87) PCT Pub. No.: WO99/57832

PCT Pub. Date: Nov. 11, 1999

(30) Foreign Application Priority Data

May 7, 1998 (JP) .................................. 10-124748

(51) Int. Cl.
*H04B 1/00* (2006.01)

(52) U.S. Cl. ..................................................... 375/141

(58) Field of Classification Search ................. 375/130, 375/140, 141, 146, 147, 219, 220, 224, 377, 375/295, 316, 259; 455/450, 446, 447, 456.6, 455/456.1, 422.2, 403, 3.01, 39, 500, 73, 455/91, 95, 130; 370/464, 431, 310
See application file for complete search history.

(56) References Cited

U.S. PATENT DOCUMENTS 4,969,159 A * 11/1990 Belcher et al. .............. 375/153
(Continued)

FOREIGN PATENT DOCUMENTS

CN 1124552 6/1996
(Continued)

OTHER PUBLICATIONS

K. Higuchi, et al., Vehicular Technology Conference IEEE 47$^{TH}$, XP-010229096, pp. 1430-1434, "Fast Cell Search Algorithm in DS-CDMA Mobile Radio Using Long Spreading Codes", May 4, 1997.
(Continued)

*Primary Examiner*—Pankaj Kumar
(74) *Attorney, Agent, or Firm*—Oblon, Spivak, McClelland, Maier & Neustadt, P.C.

(57) ABSTRACT

The present invention relates to a spreading signal assigning method and a signal transmitting method in a direct sequence CDMA mobile communication system, a mobile wireless communication system using the methods, and a transmitter, a receiver and a transceiver in the mobile wireless communication system in which an assignment method of a second spreading code is devised such that various services can be provided. The invention is configured such that a signal spread with the second spreading code is transmitted between a base station and a mobile station by assigning a code associated with each base station group or a code associated with each network type to which the base station group belongs as the second spreading code.

9 Claims, 10 Drawing Sheets

U.S. PATENT DOCUMENTS

| | | | |
|---|---|---|---|
| 5,103,459 A * | 4/1992 | Gilhousen et al. | 370/206 |
| 5,455,822 A * | 10/1995 | Dixon et al. | 370/342 |
| 5,568,654 A * | 10/1996 | Fukawa | 455/456.3 |
| 5,581,547 A * | 12/1996 | Umeda et al. | 370/342 |
| 5,673,260 A * | 9/1997 | Umeda et al. | 370/342 |
| 5,790,588 A * | 8/1998 | Fukawa et al. | 375/148 |
| 5,903,595 A * | 5/1999 | Suzuki | 375/152 |
| 5,966,377 A * | 10/1999 | Murai | 370/342 |
| 6,011,787 A * | 1/2000 | Nakano et al. | 370/335 |
| 6,044,104 A * | 3/2000 | Watanabe | 375/142 |
| 6,130,884 A * | 10/2000 | Sato | 370/335 |
| 6,144,650 A * | 11/2000 | Watanabe et al. | 370/335 |
| 6,167,037 A * | 12/2000 | Higuchi et al. | 370/335 |
| 6,188,767 B1 * | 2/2001 | Needham et al. | 380/271 |
| 6,195,343 B1 * | 2/2001 | Watanabe | 370/335 |
| 6,259,723 B1 * | 7/2001 | Miyashita | 375/141 |
| 6,445,713 B1 * | 9/2002 | Nowara | 370/441 |
| 6,526,035 B1 * | 2/2003 | Atarius et al. | 370/342 |

FOREIGN PATENT DOCUMENTS

| | | |
|---|---|---|
| CN | 1180463 | 4/1998 |
| EP | 0 825 737 | 2/1998 |
| JP | 5-130070 | 5/1993 |
| JP | 05-130070 A | 5/1993 |
| JP | 06-501349 A | 10/1994 |
| JP | 10-56439 | 2/1998 |
| JP | 10-056439 A | 2/1998 |
| WO | WO 95/22213 | 8/1995 |
| WO | WO 97/33400 | 9/1997 |

OTHER PUBLICATIONS

Seong R. Kim et al, "A Coherent Dual-Channel QPSK Modulation for CDMA Systems" Vehicular Technology Conference, 1996, Mobile Technology for the Human Race. IEEE 46$^{th}$ Atlanta. GA. Apr. 28, 1996, pp. 1848-1852.

Rodger E. Ziemer et al., "Effect of Correlation Between Subcarriers of an MCM/DSSS Communication System", Vehicular Technology Conference, 1996, Mobile Technology for the Human Race, Apr. 28, 1996 - May 1, 1996, pp. 146-150.

* cited by examiner

METHOD OF ASSIGNMENT AND TRANSMISSION OF SPREAD SIGNALS IN DIRECT SEQUENCE SPREAD SPECTRUM CDMA MOBILE COMMUNICATION SYSTEM, MOBILE COMMUNICATION SYSTEM, AND TRANSMITTER, RECEIVER AND TRANSMITTER/RECEIVER OF MOBILE COMMUNICATION SYSTEM

TECHNICAL FIELD

The present invention generally relates to a spreading signal assigning method and a signal transmitting method in a direct sequence CDMA (Code Division Multiple Access) mobile communication system which performs a multiple access by using a direct sequence method, and relates to a mobile wireless communication system using the methods, and a transmitter, a receiver and a transceiver in the mobile wireless communication system.

BACKGROUND ART

Generally, in a direct sequence CDMA system, a first spreading code group common to base stations which have the same repetition period as that of an information symbol period (hereinafter, a code which has the same repetition period as the information symbol period will be called a short code) and a second spreading code group which has a longer repetition period than the information symbol period (hereinafter, a code which has a longer repetition period than the information symbol period will be called a long code) are used. A signal is transmitted by spreading doubly with a first spreading code of the first spreading code group and a second spreading code of the second spreading code group (here, the second spreading code varies from one base station to another). The second spreading code is used in order to reduce interference from other base stations since the number of first spreading code of the first spreading code group is limited.

Figure 1:
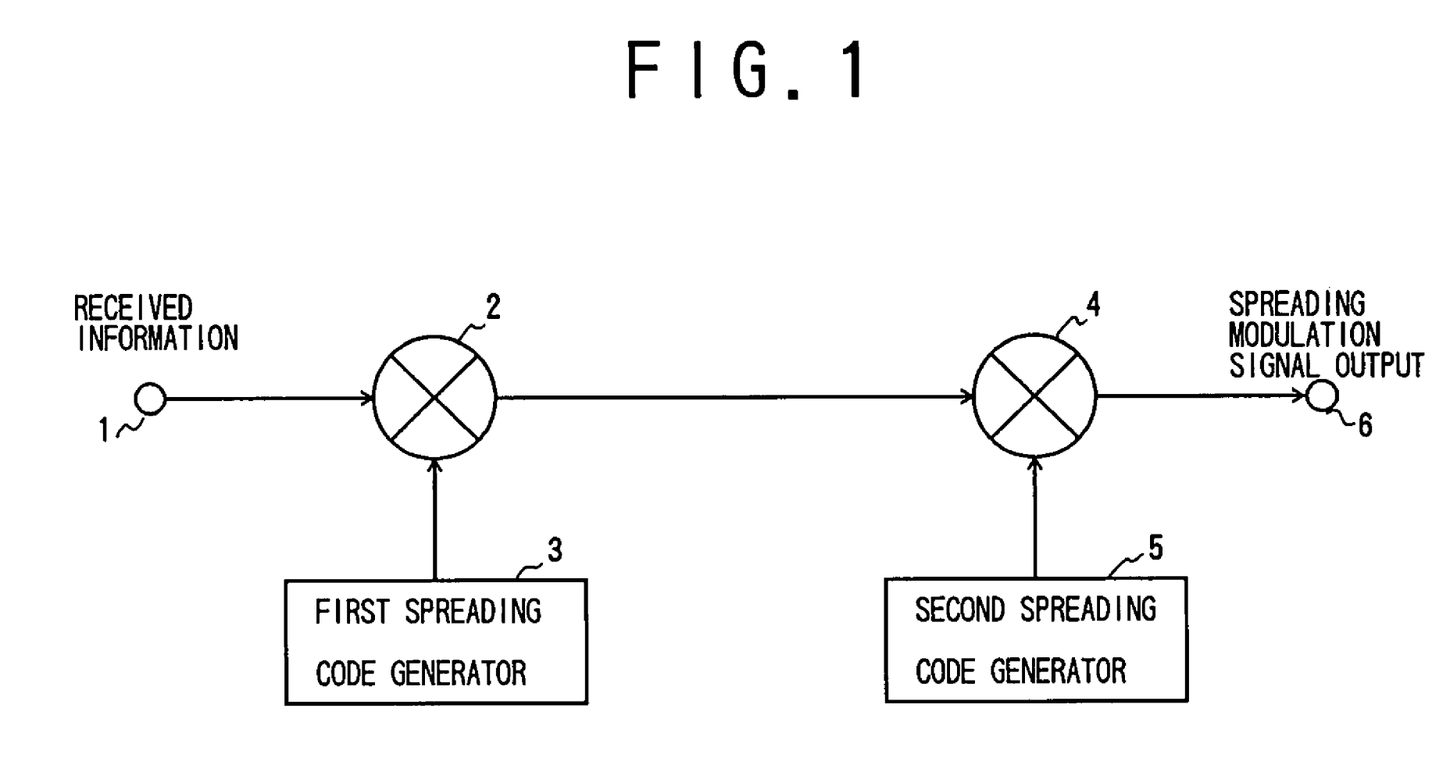
FIG. 1 is a block diagram of an example of a direct sequence system which doubly spreads a signal of the prior art 1.

FIG. 1 shows a configuration example of the direct sequence system used in general. In the system, received information is first-spread with a first spreading code. After that, the received information is second-spread with a second spreading code. Information which is applied to an input terminal 1 is first-spread in a multiplier 2 by multiplying the information by an output from a first spreading code generator 3. Next, a spreading output from the multiplier 2 is multiplied by an output from a second spreading code generator 5 such that second-spreading is performed and a spreading modulation signal output is obtained at an output terminal 6.

Figure 2:
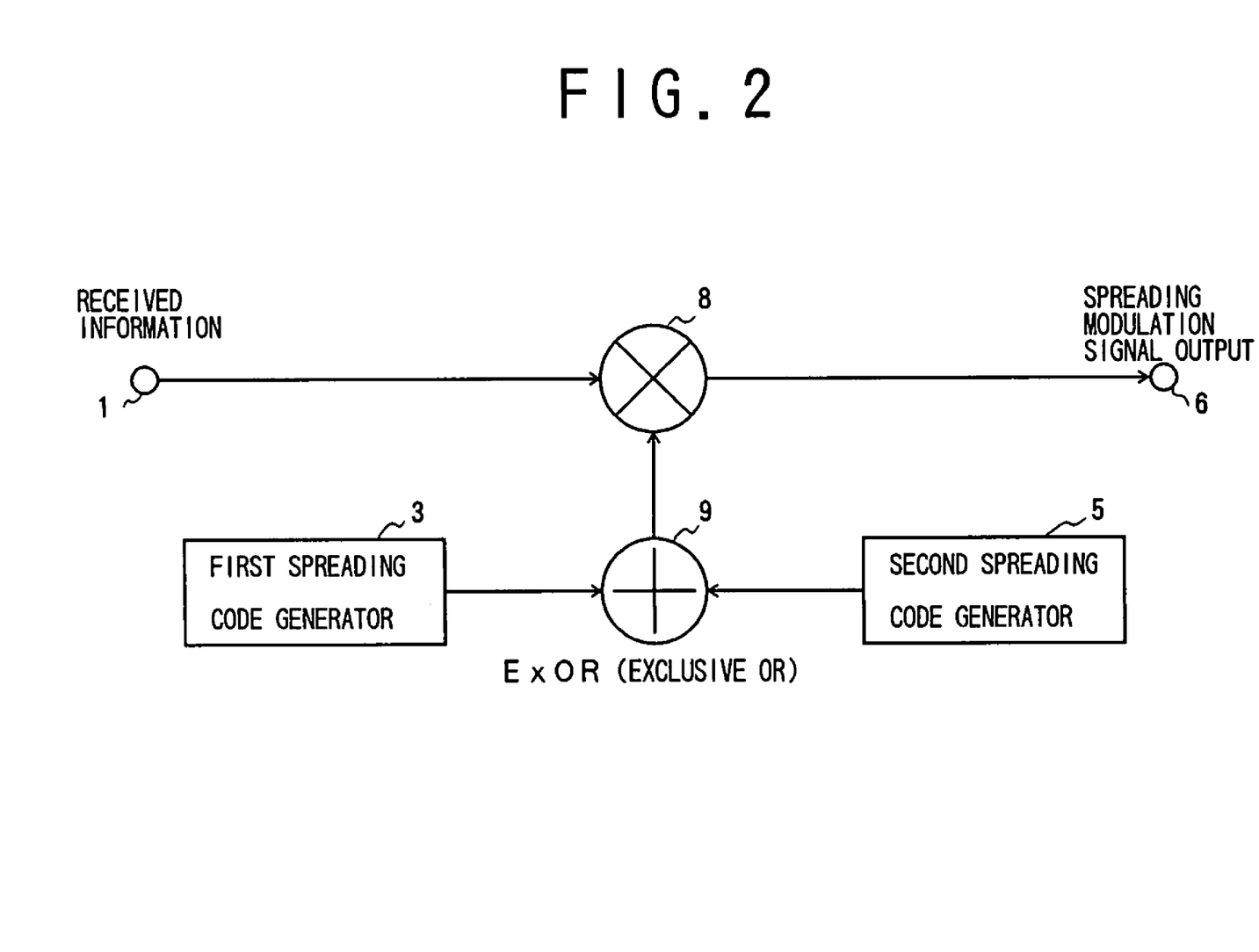
FIG. 2 is a block diagram of another example of a direct sequence system which doubly spreads a signal of the prior art 2.

FIG. 2 shows another configuration example. According to the configuration, the received information is spread by performing an exclusive OR operation on the first spreading code and the second spreading code. A result of an exclusive OR operation of an output from the first spreading code generator 3 and an output from the second spreading code generator 5 is calculated by an exclusive OR circuit 9. Information received at the input terminal 1 is calculated using the result of the exclusive OR operation in a multiplier 8 such that the spreading modulation signal output is obtained at the output terminal 6.

Here, an orthogonal code (for example, a GOLD code) is used as the first spreading code generally. The number of the orthogonal codes which are generated is limited to the number of a spreading ratio. Therefore, in a general direct sequence CDMA communication system, a signal is spread and transmitted with the second spreading code having a longer repetition period than the information symbol period as well as the first spreading code having a repetition period of the information symbol period. The second spreading code having the longer repetition period can have a large number of spreading codes by highly increasing the repetition period.

Figure 3:
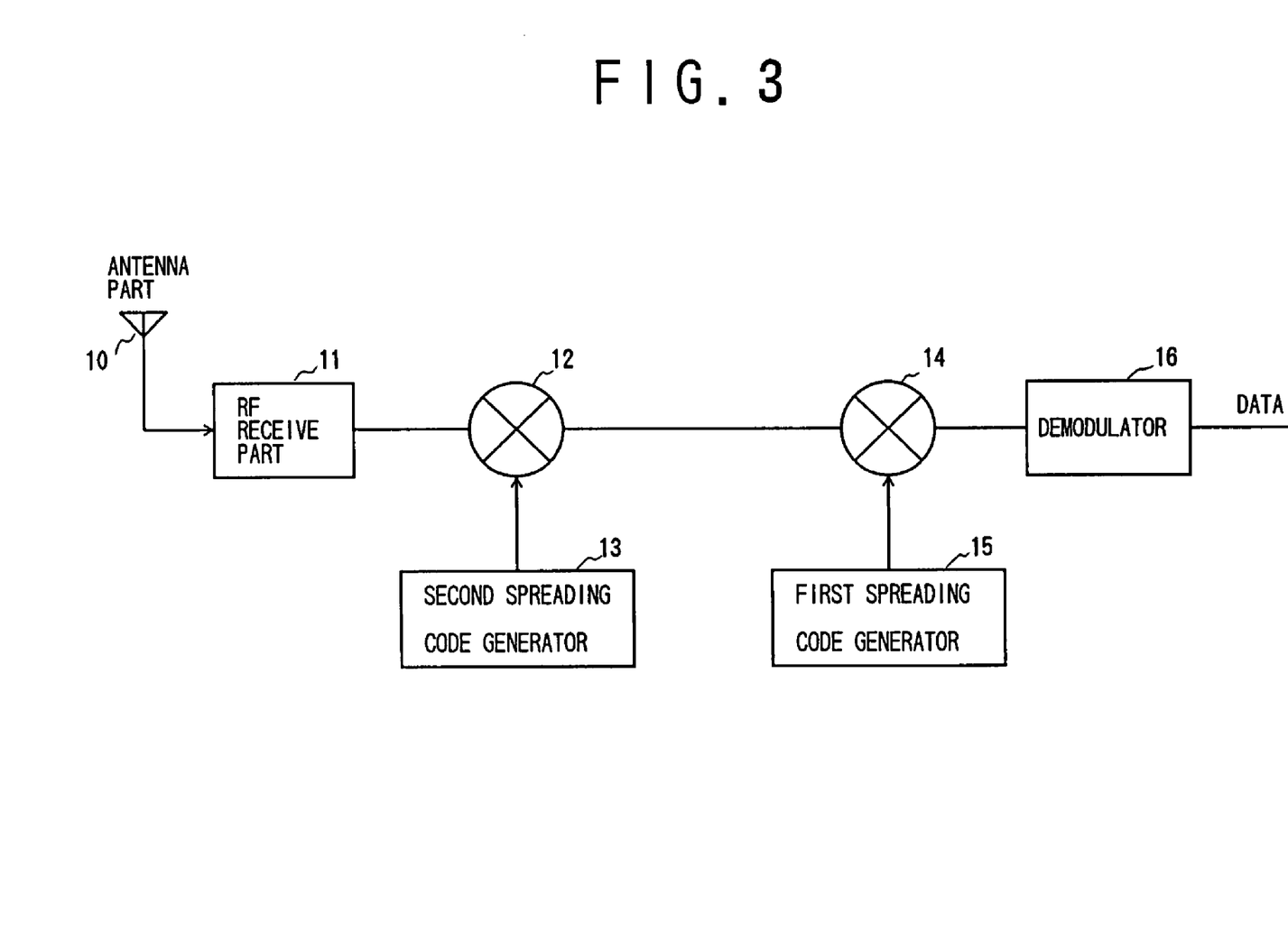
FIG. 3 is a block diagram of a receiver of the prior art.

FIG. 3 shows a configuration example of a receiver where a signal is transmitted after being spread doubly with a first spreading code and a second spreading code.

A signal which is doubly spread with the first spreading code and the second spreading code is received by an antenna part 10 and received by an RF receive part 11. The received signal is multiplied by an output from a second spreading code generator 13 in a multiplier 12 such that the received signal is first-despread. Next, an output from the multiplier 12 which is despread is multiplied by an output from a first spreading code generator 15 in a multiplier 14 such that it is second-despread, and then an output from the multiplier 14 is applied to a demodulator 16. After that, demodulated data is obtained from the demodulator 16.

Instead of despreading by using the multiplier 12 and the multiplier 14 with the second spreading code and the first spreading code, respectively, despreading can be carried out by using a multiplier with a result of an EXOR operation on the first spreading code and the second spreading code as shown in FIG. 2.

Figure 4:
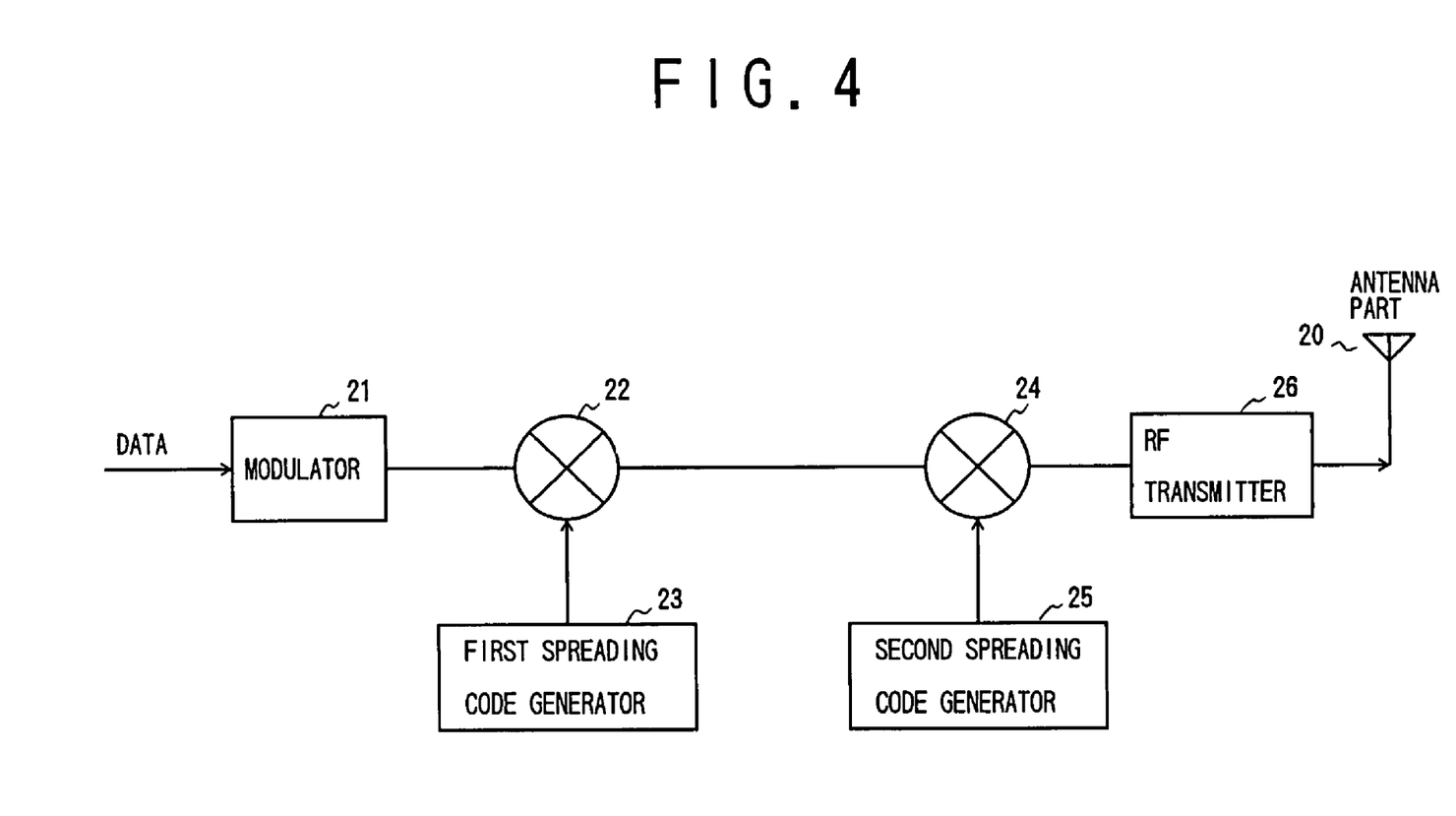
FIG. 4 is a block diagram of a transmitter of the prior art.

FIG. 4 shows a configuration example of a transmitter where a signal is spread doubly with a first spreading code and a second spreading code, and is sent.

Data to be transmitted is applied to a modulator 21. An output from the modulator 21 is multiplied by an output from the first spreading code generator 23 such that it is first-spread. Next, an output from a multiplier 22 which is spread is multiplied by an output from a second spreading code generator 25 in a multiplier 24 such that it is second-spread. Then, it is applied to an RF transmitter 26. An output from the RF transmitter 26 is output from an antenna part 20.

Instead of despreading by the multiplier 22 and the multiplier 24 with the first spreading code and the second spreading code, despreading can be carried out by using a multiplier with a result of an EXOR operation on the first spreading code and the second spreading code as shown in FIG. 2.

By the way, in a wireless mobile communication system, a mobile station communicates with a telephone terminal in a public network or the like via a wireless base station. A wireless circuit can be easily listened in on or used fraudulently since the circuit is open to the air. Hence, there have been various technologies conventionally which enable a mobile station to connect to only a specific base station in order to avoid others listening in or a fraudulent use.

For example, Japanese laid-open patent application No. 63-189026 discloses an invention of a cordless telephone system such as a normal domestic cordless telephone. In the cordless telephone, a cordless handset and a cordless base transmit/receive a unique system identifying number (which is configured by a fixed identifying number which is assigned to the cordless base and the cordless handset and a plurality of identifying numbers which determine an order) such that a cordless base which can communicate with a cordless handset is identified. Communication is allowed only when the system identifying number of the cordless base matches with the system identifying number of the cordless handset.

As another example, Japanese laid-open patent application No. 7-203540 discloses an invention regarding a business cordless telephone system which provides a roaming service for a terminal which moves in a wireless service area of a PBX. In the conventional example, a cordless handset stores a plurality of unique system identifying numbers (base station IDs) which are assigned to each system which numbers can be communicated, or the cordless handset stores a network identifying number (network ID) which indicates a plurality of system identifying numbers which can be communicated by the cordless handset. When communicating, the cordless handset identifies a cordless base which can communicate with the cordless handset by transmitting/receiving the identifying numbers. That is, when the system identifying numbers or the network identifying numbers of the cordless handset and the cordless base are the same, the cordless handset and the cordless base can communicate with each other.

Figure 5:
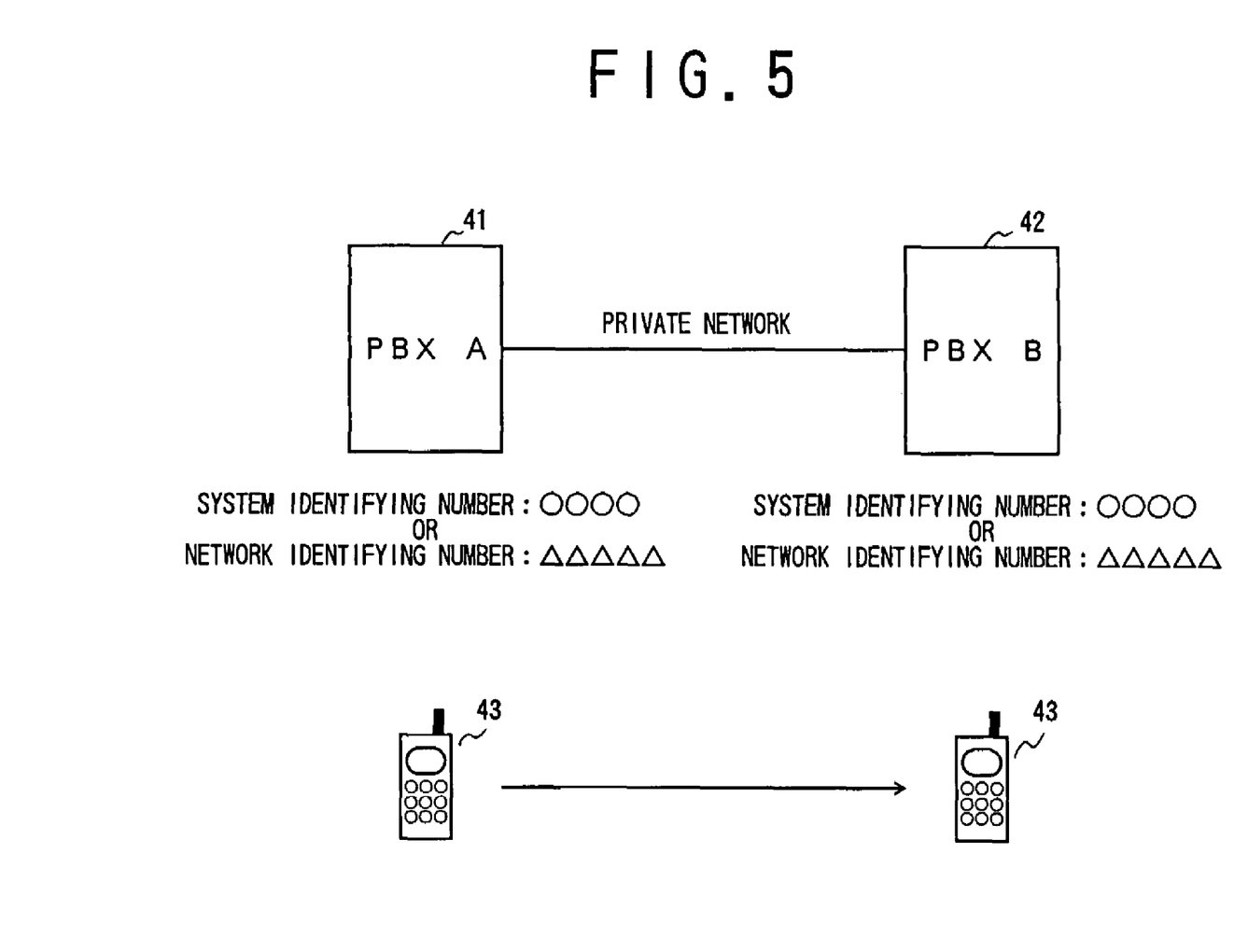
FIG. 5 is a diagram showing a roaming service between PBXs of the prior art.

FIG. 5 shows an example of a generalized configuration for a roaming service between PBXs (private branch exchanges). When a mobile terminal apparatus 43 moves from a zone of the PBX A 41 to a zone of the PBX B 42, the system identifying number or the network identifying number is checked so as to determine whether the roaming service is provided.

Generally, a control for determining whether a base station and a mobile station are allowed to connect should be carried out as quickly as possible, since the control is a preparation.

By the way, if the inventions disclosed in the above-mentioned Japanese laid-open patent application No. 63-189026 and Japanese laid-open patent application No. 7-203540 are applied as is to the direct sequence CDMA mobile communication system, the mobile station needs to receive and recognize the system identifying number or the network identifying number. For that purpose, the mobile station needs to know a spreading code (a long code or a short code) which the base station uses. After despreading a received signal with the spreading code, the mobile station can know the system identifying number or the network identifying number from an information symbol. In this case, if the spreading code is not known beforehand, it is necessary to identify the spreading code. Therefore, it takes much time for the mobile station to determine whether the mobile station can connect to the base station from the received signal. Thus, the above-mentioned method is not practical.

DISCLOSURE OF THE INVENTION

On the other hand, in the direct sequence CDMA mobile communication system, a different second spreading code, which is a different long code, for each base station is used. However, when the direct sequence CDMA mobile communication system is applied to a small mobile communication system such as a cordless telephone system and the like, the different second spreading code is not necessarily required for each base station.

The present invention is achieved in view of the above-mentioned finding that the different second spreading code is not necessarily required for each base station and the above-mentioned problems. An objective of the present invention is to provide a spreading signal assigning method and a signal transmitting method in the direct sequence CDMA mobile communication system, a mobile wireless communication system, and a transmitter, a receiver and a transceiver in the mobile wireless communication system, in which an assignment method of the second spreading code is devised such that interference between cordless systems can be avoided and a roaming service can be provided.

The invention described in claim 1 is a spreading code assigning method in a direct sequence CDMA mobile communication system for transmitting a signal after spreading the signal doubly with a first spreading code in a first spreading code group and a second spreading code in a second spreading code group, the first spreading code having the same repetition period as an information symbol period, the second spreading code having a longer repetition period than the information symbol period, the first spreading code and the second spreading code forming spreading codes for enlarging a band of a wide-band signal, a rate of the spreading codes being higher than an information rate, the method comprising the step of:

assigning a code associated with each base station group or a code associated with each network type to which the base station group belongs as the second spreading code.

According to the spreading code assigning method, by assigning a code associated with each base station group or a code associated with each network type to which the base station group belongs as the second spreading code, various services can be provided by using the second spreading code.

For example, by assigning a code associated with each network type and verifying the second spreading code between a base station and a mobile station, a roaming service becomes possible.

In addition, by assigning a code associated with each base station group or a code associated with each network type to which the base station group belongs by carrier, geographic area, floor level of a building, company, special service or the like, various services in a small area, a midsize area, a wide area, an indoor area, an outdoor area or the like become possible.

The invention described in claim 2 is a signal transmitting method in a direct sequence CDMA mobile communication system for transmitting a signal after spreading the signal doubly with a first spreading code in a first spreading code group and a second spreading code in a second spreading code group, the first spreading code having the same repetition period as an information symbol period, the second spreading code having a longer repetition period than the information symbol period, the first spreading code and the second spreading code forming spreading codes for enlarging a band of a wide-band signal, a rate of the spreading codes being higher than an information rate, the method comprising the steps of:

assigning a code associated with each base station group or a code associated with each network type to which the base station group belongs as the second spreading code; and transmitting a signal which is spread with the second spreading code between a base station and a mobile station.

According to the signal transmitting method, by assigning a code associated with each base station group or a code associated with each network type to which the base station group belongs as the second spreading code, and by transmitting a signal spread by the second spreading code, since a spreading code in itself functions as an identifying number of a cordless telephone system, the cordless handset does not need to check the identifying number of the cordless telephone system after identifying a spreading code for despreading. Thus, the cordless handset can identify easily a cordless base with which the cordless handset can communicate. In addition, the cordless handset can not communicate with a cordless base of an other cordless telephone system. Therefore, interference from other cordless telephone systems can be avoided.

Further, a roaming service and the like becomes possible by setting the second spreading code.

The invention described in claim 3 is a direct sequence CDMA mobile communication system for transmitting a signal after spreading the signal doubly with a first spreading code in a first spreading code group and a second spreading code in a second spreading code group, the first spreading code having the same repetition period as an information symbol period, the second spreading code having a longer repetition period than the information symbol period, the first spreading code and the second spreading code forming spreading codes for enlarging a band of a wide-band signal, a rate of the spreading codes being higher than an information rate, said system comprising:

a base station using the second spreading code assigned to each base station group or the second spreading code assigned to each network type to which the base station group belongs; and a mobile station communicating with the base station by using a signal which is spread by the second spreading code assigned to the base station.

According to the above-mentioned invention, the direct sequence CDMA mobile communication system which is suitable for the method described in claim 1 or 2 is provided.

The invention described in claim 4 is a transmitter in a direct sequence CDMA mobile communication system for transmitting a signal after spreading the signal doubly with a first spreading code in a first spreading code group and a second spreading code in a second spreading code group, the first spreading code having the same repetition period as an information symbol period, the second spreading code having a longer repetition period than the information symbol period, the first spreading code and the second spreading code forming spreading codes for enlarging a band of a wide-band signal, a rate of the spreading codes being higher than an information rate, the transmitter assigning a code being associated with each base station group or a code being associated with each network type to which the base station group belongs as the second spreading code, and the transmitter carrying out a communication using a signal spread by the second spreading code assigned to a base station.

The invention described in claim 5 is a receiver in a direct sequence CDMA mobile communication system for transmitting a signal after spreading the signal doubly with a first spreading code in a first spreading code group and a second spreading code in a second spreading code group, the first spreading code having the same repetition period as an information symbol period, the second spreading code having a longer repetition period than the information symbol period, the first spreading code and the second spreading code forming spreading codes for enlarging a band of a wide-band signal, a rate of the spreading codes being higher than an information rate, the receiver assigning a code associated with each base station group or a code associated with each network type to which the base station group belongs as the second spreading code, and the receiver carrying out a communication using a signal spread by the second spreading code assigned to a base station.

The invention described in claim 6 is a transceiver in a direct sequence CDMA mobile communication system for transmitting a signal after spreading the signal doubly with a first spreading code in a first spreading code group and a second spreading code in a second spreading code group, the first spreading code having the same repetition period as an information symbol period, the second spreading code having a longer repetition period than the information symbol period, the first spreading code and the second spreading code forming spreading codes for enlarging a band of a wide-band signal, a rate of the spreading codes being higher than an information rate, the transceiver assigning a code associated with each base station group or a code associated with each network type to which the base station group belongs as the second spreading code, and the transceiver carrying out a communication using a signal spread by the second spreading code assigned to a base station.

According to the inventions described in claims 4-6, the transmitter, the receiver and the transceiver in a base station or a mobile terminal apparatus in the direct sequence CDMA mobile communication system which is suitable for the method described in claim 1 or 2 are provided.

The invention described in claim 7 is the transmitter in the direct sequence CDMA mobile communication system as claimed in claim 4, the transmitter comprising:

second spreading code control means which generates and controls the second spreading code associated with each base station group or each network type to which the base station group belongs.

The invention described in claim 8 is the receiver in the direct sequence CDMA mobile communication system as claimed in claim 5, the receiver comprising:

second spreading code control means which generates and controls the second spreading code associated with each base station group or each network type to which the base station group belongs.

The invention described in claim 9 is the transceiver in the direct sequence CDMA mobile communication system as claimed in claim 6, the transceiver comprising:

second spreading code control means which generates and controls the second spreading code associated with each base station group or each network type to which the base station group belongs.

In the inventions described in claims 7-9, the second spreading code control means is provided for generating and controlling the second spreading code associated with each base station group or a network type to which the base station group belongs, in the transmitter, the receiver and the transceiver in a base station or a mobile terminal apparatus in the direct sequence CDMA mobile communication system described in claims 4-6.

BRIEF DESCRIPTION OF THE DRAWINGS

Other objects, features and advantages of the present invention will be apparent by reading the following description in conjunction with the accompanying drawings, in which.

PREFERRED EMBODIMENTS FOR CARRYING OUT THE INVENTION

In the following, embodiments of the present invention will be described with reference to figures.

Figure 6:
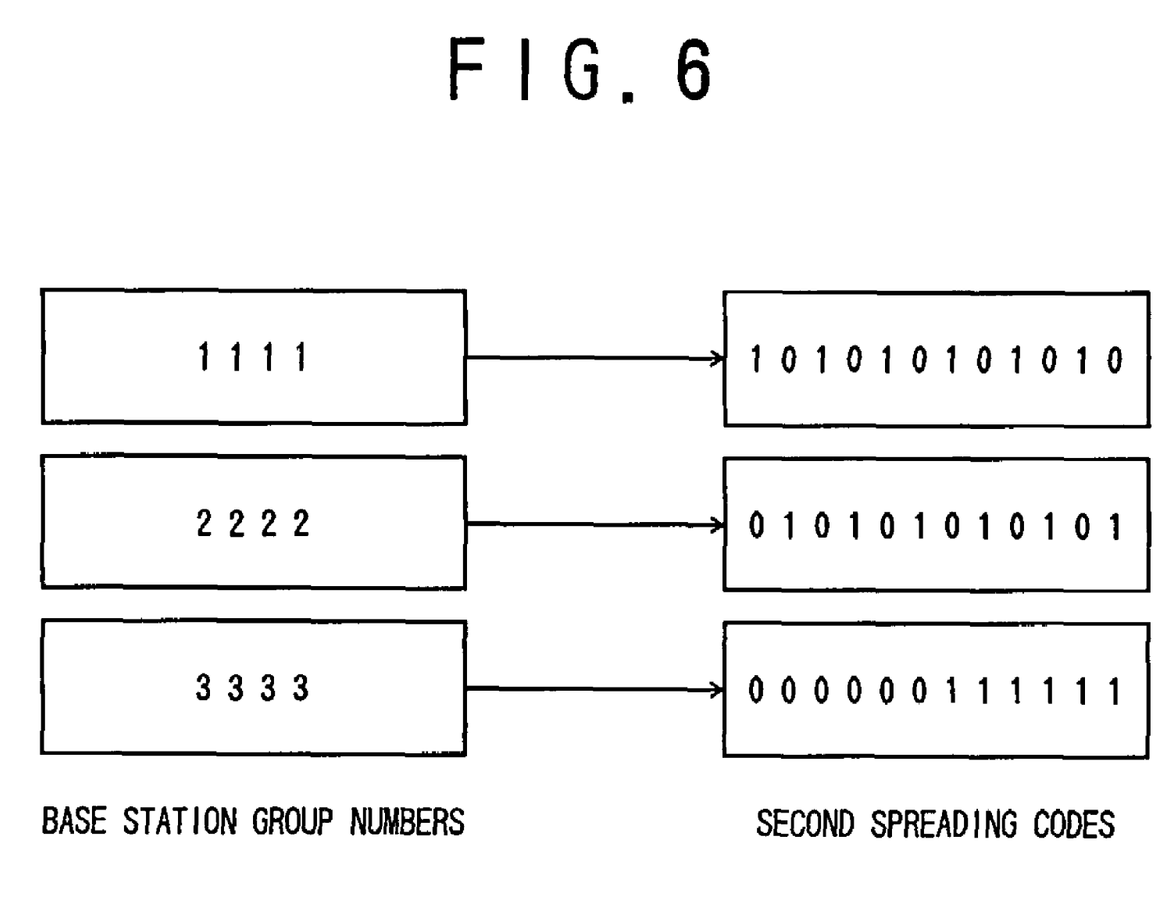
FIG. 6 is a diagram showing an example of a correspondence between base station group numbers and second spreading codes.

FIG. 6 shows an example of a correspondence between base station group numbers and second spreading codes. Conventionally, the second spreading code is assigned to each base station. On the other hand, in the example shown in FIG. 6, the second spreading code is assigned to each base station group. A mobile communication system such as a cordless telephone system and the like can be taken as an example of the base station group. That is, when there are a plurality of cordless telephone systems in a house, the second spreading code is assigned to each cordless telephone system. Therefore, in this case, cordless bases in the same cordless telephone system use the same second spreading code so as to second-spread a transmitting signal and send the signal to cordless handsets.

FIG. 6 shows an example in which the second spreading codes are assigned to three cordless telephone systems. That is, a second spreading code 101010101010 is assigned to a cordless telephone system 1111, a second spreading code 010101010101 is assigned to a cordless telephone system 2222, a second spreading code 000000111111 is assigned to a cordless telephone system 3333.

In the embodiment of the present invention shown in FIG. 6, the cordless base sends a signal after spreading the signal with a second spreading code assigned to a cordless telephone system to which the cordless base belongs. For example, with reference to FIG. 1, a cordless base of the cordless telephone system having a system identifying number 1111 multiplies information received from the input terminal 1 by an output from the first spreading code generator 3 at the multiplier 2 so as to first-spread the information. Next, a spreading output from the multiplier 2 is second-spread by the multiplier 4 with a second spreading code 101010101010 associated with the system identifying number 1111 assigned to the cordless telephone system to which the cordless base belongs, and then a spreading modulation signal output which should be transmitted to a cordless handset is obtained at the output terminal 6.

On the other hand, a cordless handset uses a second spreading code assigned to a cordless telephone system to which the cordless handset belongs. For example, the cordless handset in the cordless telephone system having the system identifying number 1111 use the same second spreading code 101010101010.

As mentioned-above, the cordless base and the cordless handset use the same second spreading code assigned to the cordless telephone system to which the cordless base and the cordless handset belong. Thus, when a cordless base and a cordless handset belong to the same cordless telephone system, the second spreading code with which the cordless base spreads a signal and the second spreading code used by the cordless handset are the same. Therefore, the cordless handset can receive a signal. Since a spreading code in itself functions as an identifying number of a cordless telephone system, the cordless does not need to check the identifying number of the cordless telephone system after identifying a spreading code for despreading. Thus, the cordless handset can identify easily a cordless base with which the cordless handset can communicate.

In addition, the cordless handset can not communicate with a cordless base of an other cordless telephone system. Therefore, interference from other cordless telephone systems can be avoided.

Figure 8:
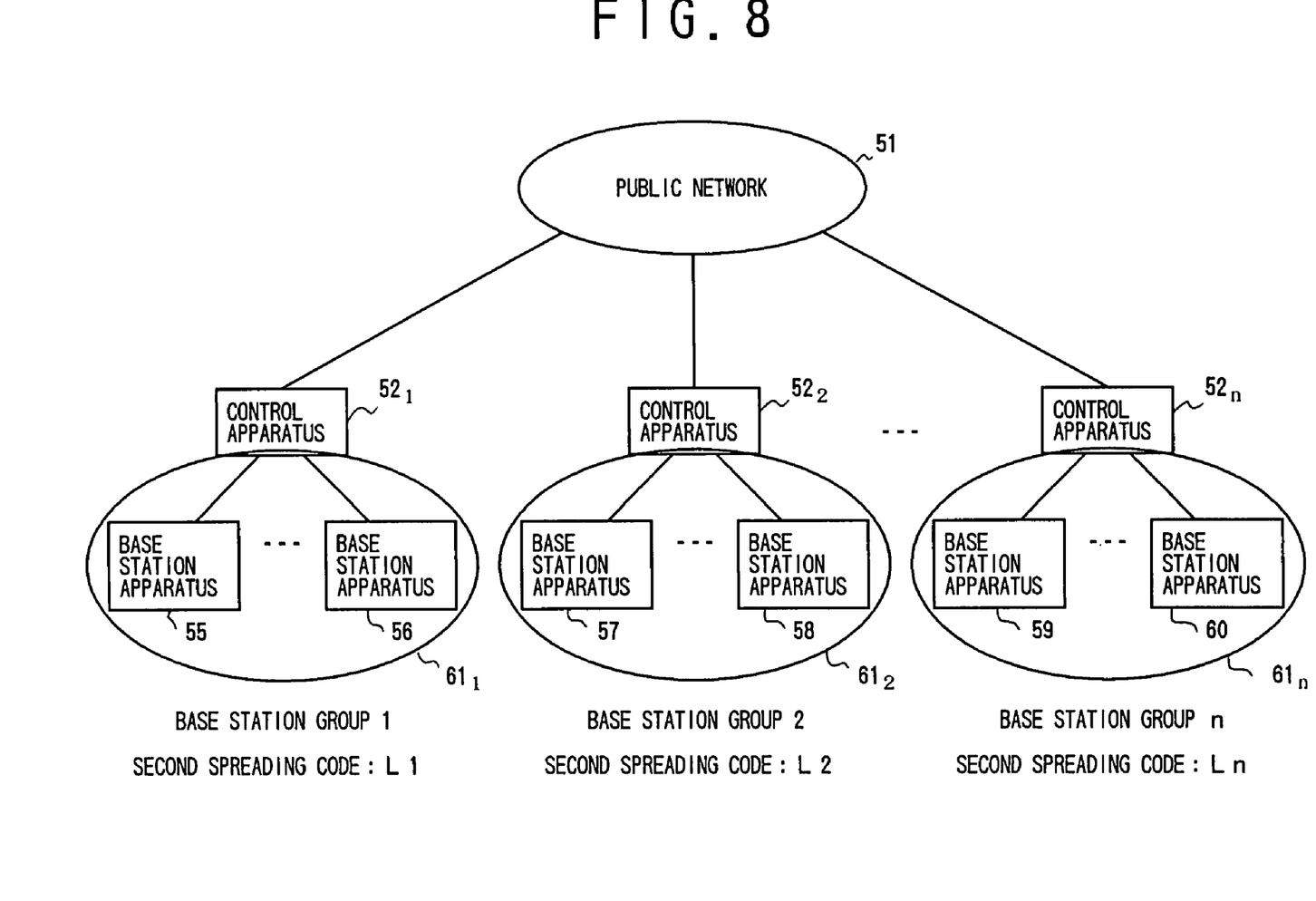
FIG. 8 is a diagram for explaining a system configuration example when assigning the second spreading code in connection with the base station group.

FIG. 8 shows an example of a direct sequence CDMA mobile communication system in the above-mentioned case. The system includes a public network 51 and the like, control apparatuses $52_1$-$52_n$ and base station apparatuses 55-60. The base station apparatuses 55 . . . 56 form a base station group 1, the base station apparatuses 57 . . . 58 form a base station group 2, and the base station apparatuses 59 . . . 60 form a base station group n.

For example, a second spreading code 101010101010 (L1) is assigned to the base station group 1, a second spreading code 010101010101 (L2) is assigned to the base station group 2, and a second spreading code 000000111111 (L3) is assigned to the base station group 3.

A mobile terminal apparatus which has the second spreading code 101010101010 (L1) assigned to the base station group 1 can communicate with base station apparatuses in the base station group 1. However, the mobile terminal apparatus can not communicate with a base station apparatus in another base station group (for example, a base station apparatus belonging to the base station group 2 or the base station group 3).

A mobile terminal apparatus having the second spreading codes 101010101010 (L1) and 010101010101 (L2) assigned to the base station group 1 and the base station group 2, respectively, can communicate with a base station apparatus in the base station group 1 and a base station apparatus in the base station group 2.

Figure 7:
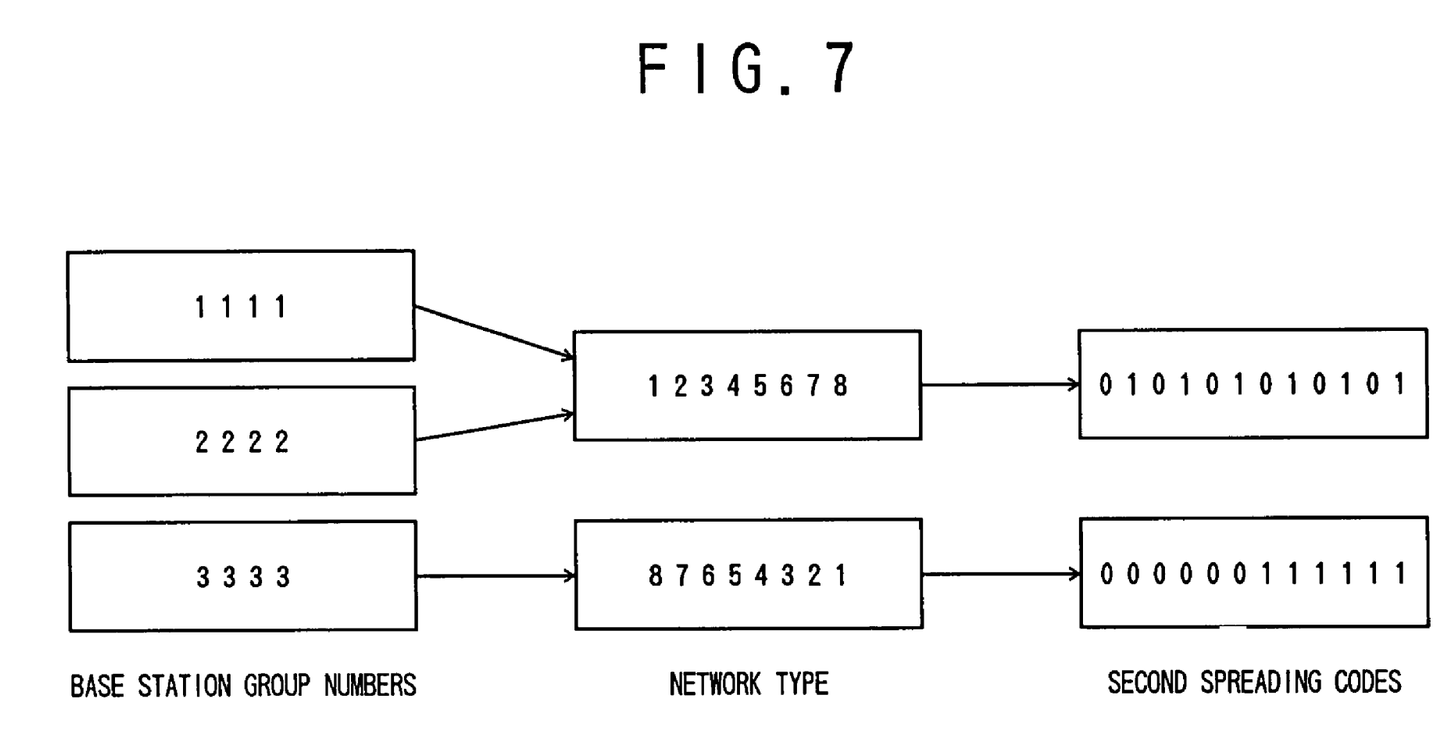
FIG. 7 is a diagram showing an example of a correspondence between base station group numbers, network identifying numbers and second spreading codes.

FIG. 7 shows a method for assigning the second spreading code which method is different from that shown in FIG. 6. In the example shown in FIG. 6, the second spreading code is assigned to each cordless telephone system. On the other hand, in the example shown in FIG. 7, the second spreading code is assigned to a unit in which a plurality of cordless telephone systems exist. (The unit including a plurality of systems is called "a network type". That is, each network type includes one or a plurality of systems.) In other words, when there are a plurality of cordless telephone systems in a house, the second spreading code is assigned to each network type. Therefore, in this case, when cordless bases of different cordless telephone systems belong to the same network type, the cordless bases can second-spread a signal with the same second spreading code and transmit the signal.

FIG. 7 shows an example of a correspondence between system identifying numbers, network identifying numbers and second spreading codes. The network identifying number is an identifying number assigned to each of the above-mentioned network types. FIG. 7 shows an example in which second spreading codes are assigned to three cordless telephone systems. Each cordless telephone system has a network identifying number associated the network type. A cordless telephone system 1111 and a cordless telephone system 2222 belong to the same network type and have the same network identifying number 12345678. A cordless telephone system 3333 has a network identifying number 87654321.

In addition, the second spreading code is assigned in correspondence with the network identifying number. A second spreading code 010101010101 is assigned to the network identifying number 12345678 and a second spreading code 000000111111 is assigned to the network identifying number 87654321.

In the embodiment shown in FIG. 7, a cordless base spreads a signal with a second spreading code assigned to a network identifying number of a cordless telephone system to which the cordless base belongs. For example, with reference to FIG. 1, a cordless base which has the system identifying number 1111 first-spreads information received from the input terminal 1 by multiplying the information by an output from the first spreading code generator 3 at the multiplier 2. Next, the cordless base second-spreads the spreading output from the multiplier 2 at the multiplier 4 with a second spreading code 010101010101 associated with the network identifying number, and obtains a spreading modulation output at the output terminal 6.

When a cordless handset moves to a zone of another cordless telephone system, the cordless handset can continue to perform a communication if the other cordless telephone system has the same network identifying number as that of the cordless telephone system to which the cordless handset originally belongs.

For example, when a cordless handset in the cordless telephone system 1111 moves to a zone of the cordless telephone system 2222, the cordless handset can continue to perform a communication since the network identifying numbers are the same and the second spreading codes from cordless bases are the same. However, when a cordless handset in the cordless telephone system 1111 moves to a zone of the cordless telephone system 3333, the cordless handset can not continue to perform a communication since the second spreading codes from the cordless bases are different.

Thus, in the direct sequence CDMA cordless telephone system, a roaming service can be provided only by assigning the second spreading code associated with the network identifying number of a cordless telephone system to which a cordless base belongs.

Figure 9:
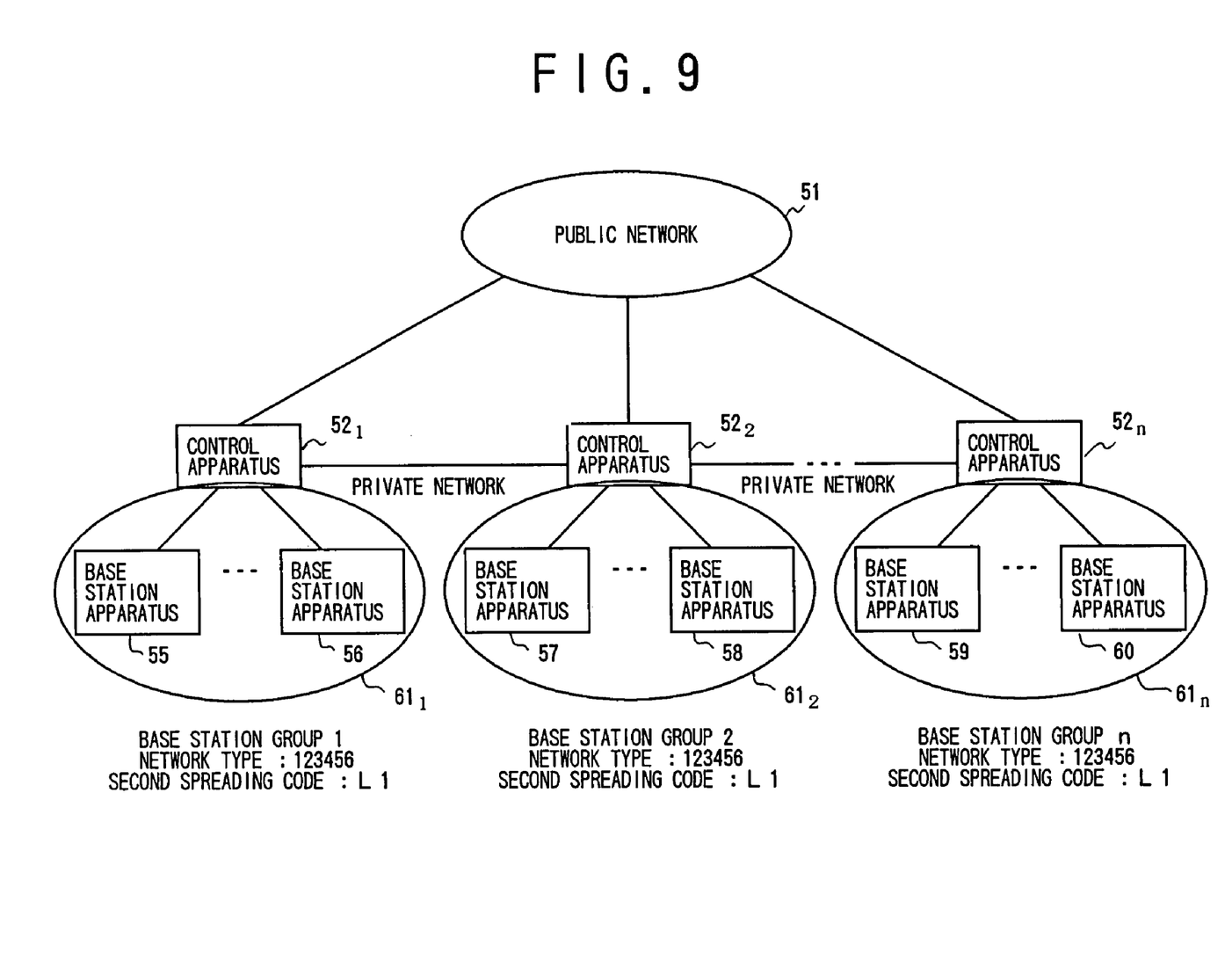
FIG. 9 is a diagram for explaining a system configuration example when assigning the second spreading code in connection with a network type.

FIG. 9 shows an example of a direct sequence CDMA mobile communication system in the above-mentioned case. The system includes the public network 51 and the like, the control apparatuses $52_1$-$52_n$ and the base station apparatuses 55-60. The base station apparatuses 55 . . . 56 form a base station group 1, the base station apparatuses 57 . . . 58 form a base station group 2, and the base station apparatuses 59 . . . 60 form a base station group n. The control apparatuses are interconnected.

For example, a network type 123456 and a second spreading code L1 are assigned to the base station group 1, the network type 123456 and the second spreading code L1 are assigned to the base station group 2, and the network type 123456 and the second spreading code L1 are assigned to the base station group n.

A mobile terminal apparatus having the second spreading code L1 can communicate with a base station apparatus in a base station group which has the second spreading code L1 (for example, base station apparatuses 55-60 which belong to the base station group 1, the base station group 2 or the base station group 3).

The roaming service can also be provided in such a way that a cordless handset has a plurality of second spreading codes associated with cordless telephone systems which obtain the roaming service.

For example, if a cordless handset has a second spreading code of a network type 789012 other than that of the network type 123456, the cordless handset can communicate with a base station group which belongs to the network type 789012.

In addition, by assigning a code associated with each base station group or a code associated with each network type to which the base station group belongs as the second spreading code, various services can be provided by using the second spreading code.

For example, by verifying the second spreading code between a base station and a mobile station, it becomes possible to restrict an originating call or an incoming call by geographic area.

In addition, by assigning a code associated with each base station group or a code associated with each network type to which the base station group belongs by carrier, geographic area, floor level of a building, company, special service or the like, various services in a small area, a midsize area, a wide area, an indoor area, an outdoor area or the like becomes possible.

Figure 10:
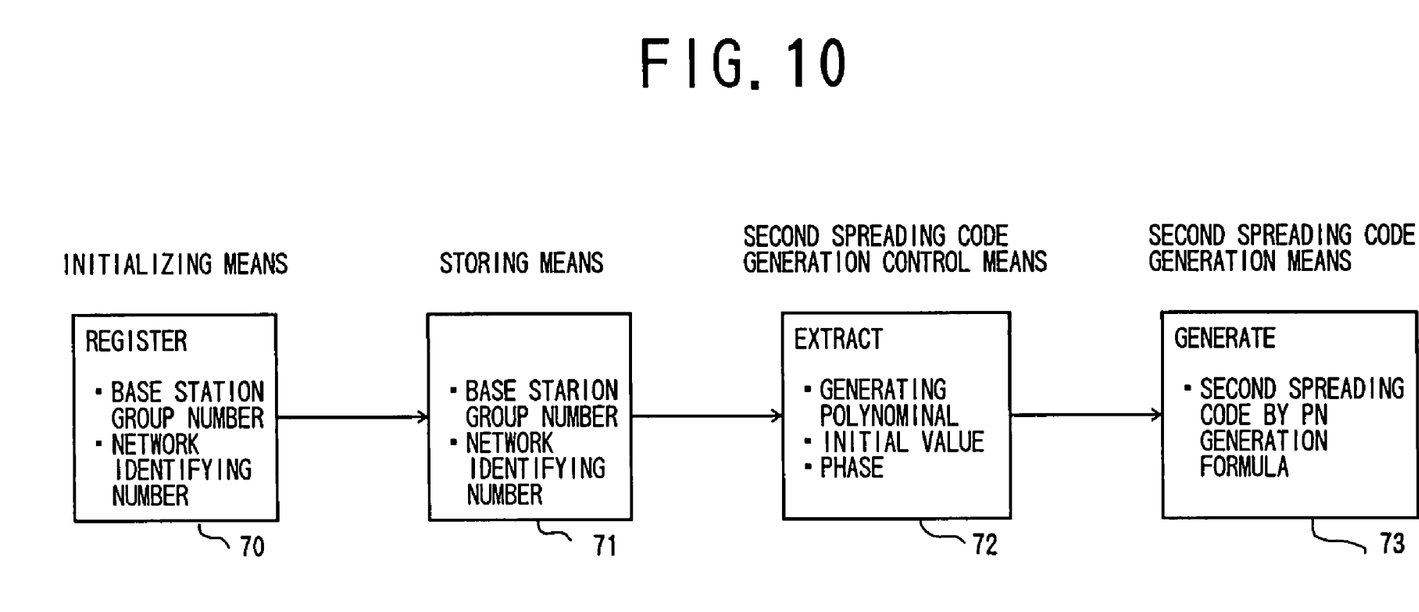
FIG. 10 is a diagram for explaining a generation method of the second spreading code.

A method for generating the second spreading code provided in a base station or a mobile terminal apparatus will be described with reference to FIG. 10. The base station or the mobile terminal apparatus includes an initializing means 70, a storing means 71, a second spreading code generation control means 72 and a second spreading code generation means 73.

When the second spreading code is generated, first, a base station group number and a network identifying number to which the base station or the mobile terminal apparatus belongs are registered (70). Then, the registered base station group number and the network identifying number are stored in the storing means 71. The second spreading code generation control means 72 extracts parameters about a generating polynomial, an initial value and a phase according to the stored base station group number and the network identifying number which was stored in the storing means 71. The second spreading code generation means 73 generates a second spreading code (for example, a PN code) on the basis of the parameters about the generating polynomial, the initial value and the phase which were extracted in the second spreading code generation control means 72.

Various systems including a sector system can be adopted as a zone configuration of the present invention. In addition, frequencies of an up link and a down link are not necessarily the same but may be different.

The present invention is not limited to the specifically disclosed embodiments, and variations and modifications may be made without departing from the scope of the invention.

The invention claimed is:

1. A spreading code assigning method in a direct sequence CDMA mobile communication system for transmitting a signal after spreading said signal doubly with a first spreading code in a first spreading code group and a second spreading code in a second spreading code group, said first spreading code having a same repetition period as an information symbol period in the communication system, said second spreading code having a longer repetition period than the information symbol period, said first spreading code and said second spreading code forming enlarging spreading codes for enlarging a band of a wide-band signal of the communication system, a rate of said enlarging spreading codes being higher than an information rate of the communication system, said method comprising the steps of:

generating a common code associated with a base station group including more than one base station as said second spreading code, wherein said second spreading code functions as an identifier of said base station group; and storing said common code in base stations of said base station group and a mobile station belonging to said base station group to permit communication between the mobile station and the base station group.

2. A signal transmitting method in a direct sequence CDMA mobile communication system for transmitting a signal after spreading said signal doubly with a first spreading code in a first spreading code group and a second spreading code in a second spreading code group, said first spreading code having the same repetition period as an information symbol period in the communication system, said second spreading code having a longer repetition period than the information symbol period, said first spreading code and said second spreading code forming enlarging spreading codes for enlarging a band of a wide-band signal of the communication system, a rate of said enlarging spreading codes being higher than an information rate of the communication system, said method comprising the steps of:

generating a common code associated with a base station group including more than one base station as said second spreading code;

storing said common code in base stations of said base station group and a mobile station belonging to said base station group to permit communication between the mobile station and the base station group; and transmitting a signal which is spread with said second spreading code between one of said more than one base station and a mobile station, wherein said second spreading code functions as an identifier of said base station group or said network type in said more than one base station and said mobile station.

3. A direct sequence CDMA mobile communication system for transmitting a signal after spreading said signal doubly with a first spreading code in a first spreading code group and a second spreading code in a second spreading code group, said first spreading code having the same repetition period as an information symbol period in the communication system, said second spreading code having a longer repetition period than the information symbol period, said first spreading code and said second spreading code forming enlarging spreading codes for enlarging a band of a wide-band signal of the communication system, a rate of said enlarging spreading codes being higher than an information rate of the communication system, said system comprising:

a base station using said second spreading code as a common code assigned to a base station group, said base station group including more than one of said base station; and a mobile station communicating with said base station by using a signal which is spread by said second spreading code assigned to said base station, wherein said second spreading code functions as an identifier of said base station group or said network type in said base station and said mobile station and said common code is stored in base stations of said base station group and a mobile station belonging to said base station group to permit communication between the mobile station and the base station group.

4. A transmitter in a direct sequence CDMA mobile communication system for transmitting a signal after spreading said signal doubly with a first spreading code in a first spreading code group and a second spreading code in a second spreading code group, said first spreading code having the same repetition period as an information symbol period in the communication system, said second spreading code having a longer repetition period than the information symbol period, said first spreading code and said second spreading code forming enlarging spreading codes for enlarging a band of a wide-band signal of the communication system, a rate of said enlarging spreading codes being higher than an information rate of the communication system, said transmitter assigning a common code associated with a base station group including more than one base station as said second spreading code, and said transmitter carrying out a communication using a signal spread by said second spreading code assigned to one of said more than one base station, wherein said second spreading code functions as an identifier of said base station group or said network type in a receiver that receives said signal from said transmitter and said common code is stored in base stations of said base station group and a mobile station belonging to said base station group to permit communication between the mobile station and the base station group.

5. A receiver in a direct sequence CDMA mobile communication system for transmitting a signal after spreading said signal doubly with a first spreading code in a first spreading code group and a second spreading code in a second spreading code group, said first spreading code having the same repetition period as an information symbol period in the communication system, said second spreading code having a longer repetition period than the information symbol period, said first spreading code and said second spreading code forming enlarging spreading codes for enlarging a band of a wide-band signal of the communication system, a rate of said enlarging spreading codes being higher than an information rate of the communication system, said receiver assigning a common code associated with each base station group including more than one base station as said second spreading code, and said receiver receiving a signal spread by said second spreading code assigned to one of said more than one base station, wherein said second spreading code functions as an identifier of said base station group or said network type in said receiver, and said common code is stored in base stations of said base station group and a mobile station belonging to said base station group to permit communication between the mobile station and the base station group.

6. A transceiver in a direct sequence CDMA mobile communication system for transmitting a signal after spreading said signal doubly with a first spreading code in first spreading code group and a second spreading code in a second spreading code group, said first spreading code having the same repetition period as an information symbol period in the communication system, said second spreading code having a longer repetition period than the information symbol period, said first spreading code and said second spreading code forming enlarging spreading codes for enlarging a band of a wide-band signal of the communication system, a rate of said enlarging spreading codes being higher than an information rate of the communication system, said transceiver assigning a common code associated with each base station group including more than one base station as said second spreading code, and said transceiver carrying out a communication using a signal spread by said second spreading code assigned, to one of said more than one base station, wherein said second spreading code functions as an identifier of said base station group or said network type in said transceiver, and said common code is stored in base stations of said base station group and a mobile station belonging to said base station group to permit communication between the mobile station and the base station group.

7. A transmitter in a direct sequence CDMA mobile communication system for transmitting a signal after spreading said signal doubly with a first spreading code in a first spreading code group and a second spreading code in a second spreading code group, said first spreading code having the same repetition period as an information symbol period in the communication system, said second spreading code having a longer repetition period than the information symbol period, said first spreading code and said second spreading code forming enlarging spreading codes for enlarging a band of a wide-band signal of the communication system, a rate of said enlarging spreading codes being higher than an information rate of the communication system, said transmitter assigning a common code associated with each base station group including more than one base station or a common code associated with each network type to which said base station group belongs as said second spreading code, and said transmitter carrying out a communication using a signal spread by said second spreading code assigned to one of said more than one base station, wherein said second spreading code functions as an identifier of said base station group or said network type in a receiver that receives said signal from said transmitter, and said common code is stored in base stations of said base station group, and a mobile station belonging to said base station group to permit communication between the mobile station and the base station group, said transmitter comprising:

second spreading code control means which generates and controls said second spreading code associated with each base station group or each network type to which said base station group belongs.

8. A receiver in a direct sequence CDMA mobile communication system for transmitting a signal after spreading said signal doubly with a first spreading code in a first spreading code group and a second spreading code in a second spreading code group, said first spreading code having the same repetition period as an information symbol period in the communication system, said second spreading code having a longer repetition period than the information symbol period, said first spreading code and said second spreading code forming enlarging spreading codes for enlarging a band of a wide-band signal of the communication system, a rate of said enlarging spreading codes being higher than an information rate of the communication system, said receiver assigning a common code associated with each base station group including more than one base station or a common code associated with each network type to which said base station group belongs as said second spreading code, and said receiver receiving a signal spread by said second spreading code assigned to one of said more than one base station, wherein said second spreading code functions as an identifier of said base station group or said network type in said receiver, and said common code is stored in base stations of said base station group and a mobile station belonging to said base station group to permit communication between the mobile station and the base station group, said receiver comprising:

second spreading code control means which generates and controls said second spreading code associated with each base station group or each network type to which said base station group belongs.

9. A transceiver in a direct sequence CDMA mobile communication system for transmitting a signal after spreading said signal doubly with a first spreading code in first spreading code group and a second spreading code in a second spreading code group, said first spreading code having the same repetition period as an information symbol period in the communication system, said second spreading code having a longer repetition period than the information symbol period, said first spreading code and said second spreading code forming enlarging spreading codes for enlarging a band of a wide-band signal of the communication system, a rate of said enlarging spreading codes being higher than an information rate of the communication system, said transceiver assigning a common code associated with each base station group including more than one base station or a common code associated with each network type to which said base station group belongs as said second spreading code, and said transceiver carrying out a communication using a signal spread by said second spreading code assigned, to one of said more than one base station, wherein said second spreading code functions as an identifier of said base station group or said network type in said transceiver, and said common code is stored in base stations of said base station group and a mobile station belonging to said base station group to permit communication between the mobile station and the base station group, said transceiver comprising:

second spreading code control means which generates and controls said second spreading code associated with each base station group or each network type to which said base station group belongs.

* * * * *